(12) United States Patent
Falk

(10) Patent No.: US 11,658,825 B2
(45) Date of Patent: May 23, 2023

(54) SECURING AN ITEM OF DEVICE USE INFORMATION OF A DEVICE

(71) Applicant: SIEMENS AKTIENGESELLSCHAFT, Munich (DE)

(72) Inventor: Rainer Falk, Poing (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 323 days.

(21) Appl. No.: 16/326,782

(22) PCT Filed: Jul. 4, 2017

(86) PCT No.: PCT/EP2017/066567
§ 371 (c)(1),
(2) Date: Feb. 20, 2019

(87) PCT Pub. No.: WO2018/036700
PCT Pub. Date: Mar. 1, 2018

(65) Prior Publication Data
US 2019/0190720 A1    Jun. 20, 2019

(30) Foreign Application Priority Data

Aug. 24, 2016  (DE) .................... 10 2016 215 914.3

(51) Int. Cl.
*H04L 29/06* (2006.01)
*H04L 9/32* (2006.01)
*H04L 9/00* (2022.01)

(52) U.S. Cl.
CPC .............. *H04L 9/3236* (2013.01); *H04L 9/50* (2022.05); *H04L 2209/42* (2013.01); *H04L 2209/56* (2013.01)

(58) Field of Classification Search
CPC ............... H04L 9/3236; H04L 2209/56; H04L 2209/38; H04L 2209/42
See application file for complete search history.

(56) References Cited

U.S. PATENT DOCUMENTS

| | | |
|---|---|---|
| 2005/0015600 A1 | 1/2005 | Miyazaki et al. |
| 2008/0294903 A1 | 11/2008 | Miyazaki et al. |
| | (Continued) | |

FOREIGN PATENT DOCUMENTS

| | | |
|---|---|---|
| CN | 105591753 A | 5/2016 |
| CN | 105719172 A | 6/2016 |
| | (Continued) | |

OTHER PUBLICATIONS

Dorri et al. "Blockchain in Internet of Things: Challenges and Solutions", https: https://arxiv.org/ftp/arxiv/papers/1608/1608.05187.pdf, Aug. 18, 2016 (Year: 2016).*

(Continued)

*Primary Examiner* — Taghi T Arani
*Assistant Examiner* — Lin Chang
(74) *Attorney, Agent, or Firm* — Schmeiser, Olsen & Watts LLP

(57) ABSTRACT

Provided is a method for securing an item of device use information of a device, having the following steps: —determining the item of device use information; —generating transaction data depending on the item of device use information; —generating a blockchain data structure which is based on a cryptocurrency and includes the transaction data or a checksum of the transaction data; —sending the generated blockchain data structure to at least one blockchain node. The item of device use information of a device according to the described method is change-protected by a decentralized security structure. Thanks to the distributed blockchain database, the item of device use information of (Continued)

the device cannot be manipulated subsequently. The use of the decentralized blockchain technology also advantageously means that no central trusted point or party is necessary.

12 Claims, 2 Drawing Sheets

(56) References Cited

U.S. PATENT DOCUMENTS

| | | | |
|---|---|---|---|
| 2010/0027780 A1 | 2/2010 | Jung et al. | |
| 2013/0198737 A1* | 8/2013 | Ricci | B60R 25/01 717/174 |
| 2015/0332283 A1 | 11/2015 | Park et al. | |
| 2015/0356795 A1* | 12/2015 | Warren | B60W 40/09 701/31.5 |
| 2017/0013047 A1* | 1/2017 | Hubbard | H04L 67/535 |
| 2017/0046652 A1* | 2/2017 | Haldenby | G06F 21/645 |
| 2017/0053460 A1* | 2/2017 | Hauser | G07C 5/04 |
| 2017/0132625 A1* | 5/2017 | Kennedy | G06Q 20/065 |
| 2017/0243208 A1* | 8/2017 | Kurian | G06Q 20/322 |
| 2017/0365169 A1* | 12/2017 | Tennent | G08G 1/08 |
| 2018/0018723 A1* | 1/2018 | Nagla | H04L 63/08 |
| 2018/0025166 A1* | 1/2018 | Daniel | G06Q 10/06 713/189 |
| 2018/0117447 A1* | 5/2018 | Tran | G06Q 20/382 |
| 2018/0343307 A1* | 11/2018 | Lotter | H04W 12/37 |
| 2019/0033845 A1* | 1/2019 | Celia | G06K 9/6263 |
| 2019/0190720 A1 | 6/2019 | Falk | |

FOREIGN PATENT DOCUMENTS

| | | |
|---|---|---|
| DE | 102014224202 A1 | 6/2016 |
| DE | 102016215914 A1 | 3/2018 |
| JP | 2005050022 A | 2/2005 |
| JP | 2005051734 A | 2/2005 |
| JP | 2010009572 A | 1/2010 |
| JP | 2011238270 A | 11/2011 |
| JP | 2013094318 A | 5/2013 |
| WO | WO2005065358 * | 7/2005 |
| WO | 2008059047 A2 | 5/2008 |
| WO | WO 2010064439 A1 | 6/2010 |

OTHER PUBLICATIONS

Figure 1:
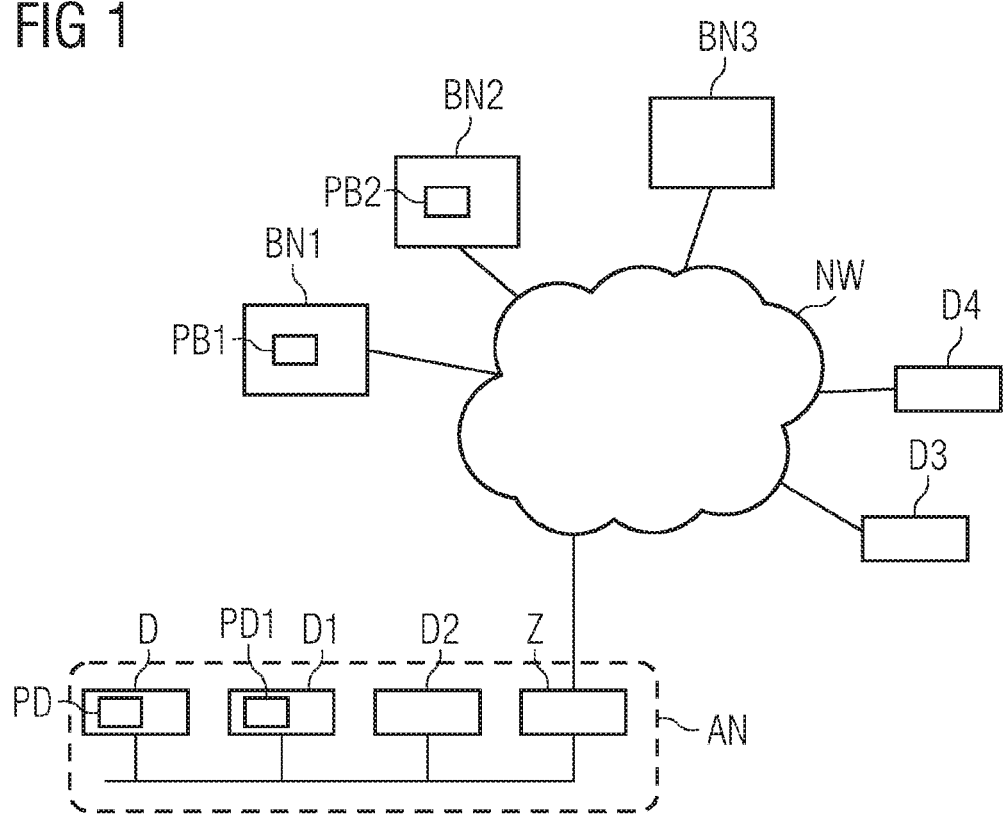

Andreas M. Antonopoulos, "Mastering Bitcoin. Unlocking Digital Crypto-Currencies.", O'Reilly Media, Apr. 2014) (Year: 2014).*
Tabata Yasuyuki: "Blockchain and Innovation in Financial Transactions", Nomura Capital Markets Quarterly, JP, Nomura Institute of Capital Markets Research, Nov. 1, 2015, vol. 19, No. 2, pp. 11-35; 2015.
Crosby Michael et al: "BlockChain Technology Beyond Bitcoin", XP055363520, Gefunden im Internet: URL:http://scet.berkeley.edu/wp-content/uploads/BlockchainPaper.pdf p. 5, line 23—p. 11, line 9; fig. 1,2,4; p. 15, line 1—p. 19, line 4; 2015.
Forte Pasquale et al: "Beyond Bitcoin—Part I: A critical lock at blockchain-based systems", International Association for Cryptologic Research,, vol. 20151202:213043, pp. 1-34, XP061019757, p. 2, line 4—p. 4, line 12; p. 2, line 27—p. 23, line 12; fig. 1,2; 2015.
Christidis Konstantinos et al: "Blockchains and Smart Contracts for the Internet of Things", IEEE Access, vol. 4, pp. 2292-2303, XP011613134, DOI: 10.1109/ACCESS.2016.2566339, retrieved on Jun. 3, 2016; abstract pp. 2296-22298, p. 2293, left column, paragraph 1-3, p. 2296, left column, paragraph 3, p. 2298, left column, last paragraph, p. 2298, right column, last and penultimate paragraph, abstract, fig. 1; 2016.
Dorri Ali et al: "Blockchain in internetof things: Challenges and Solutions", XP055395167, Gefunden im Internet: URL:https://arxiv.org/ftp/arxiv/papers/1608/1608.05187. pdf p. 3, line 4—p. 8, line 18; Fig. 1, 2(a); 2016.
Wikipedia: Blockchain DE; 2016.
PCT International Search Report dated Sep. 29, 2017 corresponding to PCT International Application No. PCT/EP2017/066567 filed Jul. 4, 2017.
Chinese Office Action dated May 31, 2021 for Application No. 201780065900.6.
Wang Jiahao et al.; "Key Technologies of Hierarchical Wireless Sensor Networks" Oct. 31, 2013.

* cited by examiner

SECURING AN ITEM OF DEVICE USE INFORMATION OF A DEVICE

CROSS-REFERENCE TO RELATED APPLICATIONS

This application claims priority to PCT Application No. PCT/EP2017/066567, having a filing date of Jul. 4, 2017, which is based on German Application No. 10 2016 215 914.3, having a filing date of Aug. 24, 2016, the entire contents both of which are hereby incorporated by reference.

FIELD OF TECHNOLOGY

The following relates to a method and a system for securing device usage information of a device.

BACKGROUND

In the private and in the industrial sector, devices or machines or electronic components, during their operating time, are subject to maintenance, repairs, post-accident repairs and a wide variety of usages or types of usage. Usage may be defined for example in terms of operating hours during which a device is in use, or distances that are covered by a vehicle.

Such information may be stored in an electronic usage indicator or electronic device usage indicator, for example a mileage counter of a vehicle or operating hours counter of a machine, or on a trusted server.

For various reasons, there may be a requirement to protect the correctness or integrity of a usage indicator of a device. In particular in the industrial sector, there may be safety requirements that require manipulation protection for a device usage indicator. Furthermore, warranty claims may be validated using verifiable usage information, for example.

The prior art discloses methods in which information about maintenance work or repairs or mileage indications are stored in controllers or databases. In particular, central servers are used to store device usage information. In order to provide secure storage or manipulation protection for such information, up until now trusted central authorities have been required, which for example issue certificates or provide a key infrastructure and which is trusted by all participants or all parties with an interest in the device usage information.

Against this background, there is a requirement to secure device usage information with the aid of a decentralized mechanism.

SUMMARY

An aspect relates to a method for securing device usage information of a device, having the following steps:
 determining the device usage information;
 generating transaction data depending on the device usage information;
 generating a blockchain data structure, wherein the blockchain data structure is based on a cryptocurrency and comprises the transaction data or a checksum of the transaction data;
 transmitting the generated blockchain data structure to at least one blockchain node.

Blockchain technology forms a distributed, decentralized database in which transactions are able to be filed in a manner protected against manipulation. To this end, transactions are stored in a block. In addition to one or more transactions, a hash value of a preceding block is stored in such a blockchain data structure. The protection is provided by a plurality of trusted nodes in a blockchain network, which performs what is known as mining or validation of blocks. In the network of nodes participating in a blockchain, a new block is formed at regular intervals, for example every 10 minutes, and in the process the hash value of an existing block is stored therewith. In this mining process, the validity of transactions to be stored in the block is checked. In addition, what is known as a cryptographic puzzle is solved, to which the mining nodes have to contribute computational capacity. The effort is rewarded for example through a specific payment in the cryptocurrency on which the blockchain is based. The solving of the cryptographic puzzle is also referred to as proof of work indicator. The solving of a computationally intensive task that needs to be solved depending on the content of a block is proven. The chain of the blocks is stored in a multiplicity of blockchain nodes, and the participating nodes are synchronized. The information on the transactions is thus stored redundantly in the network.

Since all of the blocks are formed on the basis of existing blocks, since the hash value of the preceding block is inserted into a new block, a chain is formed. The transactions are thus protected against manipulation as a chain is able to be traced back to an initial block, also called genesis block, by virtue of the chaining of the blocks. As the transactions are available via the blockchain network, it is able to be traced back to which block in the chain content of a transaction no longer corresponds to the previous versions, for example. The transactions are thus stored in each verified blockchain in a manner protected against manipulation. A modification of a transaction in a block that was already formed at an earlier time in the network would be able to be traced back if a checksum formation were to be traced back over the existing blocks.

Within a blockchain network that is public and in which each node is therefore not able to be individually trusted, a block is validated in particular in that a particular time is awaited after the block has been created or the formation of a certain number of blocks is awaited after the block, until the chain is long enough that it is able to be trusted. By way of example, another chain path is formed in parallel that turns out not to be trustworthy, since the multiplicity of nodes does not verify the transactions of the blocks formed therein or of a block, but rather forms further blocks in the trusted longer chain. To this end, an attacker must not have more computational capacity than the rest of the blockchain together, as otherwise he could form sufficiently long chains himself more quickly through his own fraudulent mining.

A blockchain data structure or a block comprises transaction data and at least one hash value that is formed depending on a preceding block. A chain consisting of transactions is thereby formed. Transactions that appear once in the chain are no longer changeable in an unseen manner. The transaction data relate to one transaction or a plurality of transactions. A blockchain data structure contains in particular a checksum of transaction data or these checksums and further data, such as for example a timestamp. By way of example, a checksum of transaction data that consist of a plurality of transactions is formed. Cryptographic hash functions are used in particular for the checksum formation.

Through what is known as mining of the blocks for an incentive, which is formed for example by a payment in the cryptocurrency, there is an interest for the decentralized network structure to confirm blocks as being correct or to validate them, that is to say to perform mining. As long as the majority of the computational capacity in such a distributed network is free from attackers, that is to say an attacker is not able to issue more blocks through mining, in particular is able to solve more cryptographic puzzles than the trusted nodes put together, a blockchain is able to be trusted from a particular length, and in particular an individual block after a certain number of successive blocks in a path of the chain is able to be trusted.

Known blockchain systems are Bitcoin and Ethereum. Although Bitcoin was originally created for cryptocurrency transfers, Ethereum is built on the incorporation of what are called smart contracts. The conditions agreed upon in a smart contract are secured by the blockchain and the contract itself is drawn up over the network. The implementation of the contractual conditions is controlled through associated transactions that are performed, and follow-up actions provided in a programmed smart contract may be performed depending on the transaction that has taken place.

For non-public blockchain systems, blockchains are also conceivable in which mining is performed without an incentive, since for example all of the nodes are trusted.

Advantageously, the transaction data are generated depending on the device usage information, for example by a processor of the device itself or by a central computer, associated with a plurality of devices, in an automation network. A blockchain data structure is formed from these transaction data or from a checksum derived therefrom, for example by one or more blockchain nodes that have determined the transaction data or the checksum thereof from the network. The device usage information is thus stored in a blockchain in a manner protected against manipulation. A block is formed from the transaction data or the checksum thereof, in particular together with further data, and a blockchain data structure is generated by incorporating the hash value of a preceding block. Blocks are thus generated actively, and store device usage information of a device in a manner protected against manipulation. For this purpose, the generated blockchain data structure is ultimately transmitted to a blockchain node or in parallel to a plurality of blockchain nodes, possibly also by a plurality of nodes that have formed the same blockchain data structure.

The device is for example a machine for industrial application, for example a machine tool, a construction machine, a truck or an aircraft or components of an industrial installation, for example drives, converters or turbines.

The device usage data of these devices according to the method that is described are present in a manner protected against change by a decentralized security structure. By virtue of the distributed blockchain database, the device usage information of the device is not able to be retrospectively manipulated. By virtue of the use of decentralized blockchain technology, a central trusted body or authority is advantageously at the same time not necessary. In particular, a central authority that issues trusted keys in order to protect device usage data is not necessary.

The device usage information is able to be checked by a third party at any time, including a long time after the block has been created. The manipulation of usage data, such as for example mileage manipulation, is thus prevented in the framework of an established blockchain network.

A transaction that comprises device usage information is only valid when the value of the device usage information is greater than that of a preceding transaction containing device usage information of the same device. When validating the blockchain, it is therefore ensured that a transaction that comprises device usage information is only recognized as valid and is incorporated into the blockchain when the value of the device usage information increases. Accordingly, it is able to be checked, for device usage information of a device that relates to abrasion or wear, that its value drops.

Furthermore, a complex or expensive central infrastructure, which would have to be used for example by manufacturers or sellers in order to ensure securing of device usage information in a conventional manner, advantageously therefore does not need to be provided.

The transaction data are inserted into the blockchain in particular not in plain text, but rather a hash value of the transaction is formed. The transaction data themselves are likewise available in the blockchain network. It is thus possible to check the transaction through mining nodes or miners. The transaction data or a transaction in plain text are thus distributed in the network and in particular transmitted from a device to one or more blockchain nodes.

According to one refinement, the device usage information contains usage information of the device and identification information of the device. The transaction data thus specify usage information of the device and the associated identification information for identifying the device. A secure association of a device with its usage information is thus ensured.

According to one refinement, the usage information includes an operating time, a mileage, operating hours, repair data, diagnostic data, wear data or maintenance data. The common feature of the usage information is that it has to be protected against manipulation, since it is able to be used for example to influence the value of the device or to declare a liability case. It is therefore sensitive data that should be able to be reliably traced back retrospectively for third parties.

According to one refinement, a hash value of the usage information is formed, and the hash value enters into the transaction data. The usage information is therefore advantageously not publicly available in the blockchain database.

According to one refinement, a hash value of the usage information and a random or pseudorandom string of characters is formed, and the hash value enters into the transaction data. This again increases confidentiality protection of the usage information in the public blockchain database.

According to one refinement, the identification information is configured in the form of pseudonym information of the device. Confidential information that should not be disclosed, for example due to contractual regulations, is thus also able to be put into circulation in the decentralized and public data structure.

According to one refinement, the pseudonym information is configured in the form of a hash value of the identity information or in the form of a hash value of the identity information and a random or pseudorandom string of characters. This allows improved confidentiality protection of the identity information in the public blockchain database.

According to one refinement, a hash value of the device usage information is formed, and the hash value enters into the transaction data. The transaction data underlying the blockchain data structure thus advantageously comprise a common checksum that comprises all of the data relevant to the usage of the device or that is based on these data.

According to one refinement, the blockchain data structure contains further transaction data, a timestamp, a digital signature and/or a proof of work indicator.

According to one refinement, the transaction data or the device usage information or the usage information or the identity information is secured by way of a cryptographic checksum or of a message authentication code or of a digital signature or of a certificate. In particular, additional protection is provided for the device usage information in the decentralized blockchain data structure that is based on a central trusted authority. By way of example, the cryptographic checksums, signatures or certificates are generated and checked with the aid of key pairs of a PKI infrastructure. A particularly advantageous combination of decentralized and central manipulation protection mechanisms is therefore used. The security of device usage information stored in the blockchain, in addition to the security achieved by virtue of the blockchain formation, including the mining, is increased even further by cryptographic security based on a trusted body. By way of example, the transaction data together with the cryptographic checksum are distributed in the blockchain network such that nodes that have knowledge about a common key or a public key are able to check the trustworthiness of the creator of the transaction and the integrity of the transaction data using cryptographic methods. In particular, the transaction data or a checksum of the transaction data are also stored in the blockchain together with the cryptographic checksum.

The embodiments relates furthermore to a system for securing device usage information of a device, comprising:
 a unit for determining the device usage information;
 a first processor for generating transaction data depending on the device usage information;
 at least one second processor for generating a blockchain data structure, wherein the blockchain data structure is based on a cryptocurrency and comprises the transaction data or a checksum of the transaction data;
 at least one blockchain node for transmitting the generated blockchain data structure to at least one further blockchain node.

The unit may be implemented in the form of hardware and/or also in the form of software. In an implementation in the form of hardware, the respective unit may be configured in the form of a device or in the form of part of a device, for example in the form of a computer or in the form of a microprocessor. In an implementation in the form of software, the respective unit may be configured in the form of a computer program product (non-transitory computer readable storage medium having instructions, which when executed by a processor, perform actions), in the form of a function, in the form of a routine, in the form of part of a program code or in the form of an executable object.

A processor should be understood to mean an electronic circuit for computer-based data processing, for example a CPU. It may also be the CPU of a computer or a microprocessor of a microchip.

According to one refinement, the first processor is furthermore configured so as to secure the device usage information or usage information or identity information by way of a cryptographic checksum or of a message authentication code or of a certificate.

According to one refinement, the second processor is furthermore configured so as to form a hash value using the device usage information or using the usage information or using the identity information, in each case in particular in accordance with a combination with a random or pseudo-random string of characters.

According to one refinement, the second processor is formed on the blockchain node.

According to one refinement, the unit and the first processor are formed on the device.

According to one refinement, the unit is a node associated with the device in an automation network, in particular a diagnostic computer.

BRIEF DESCRIPTION

Figure 2:
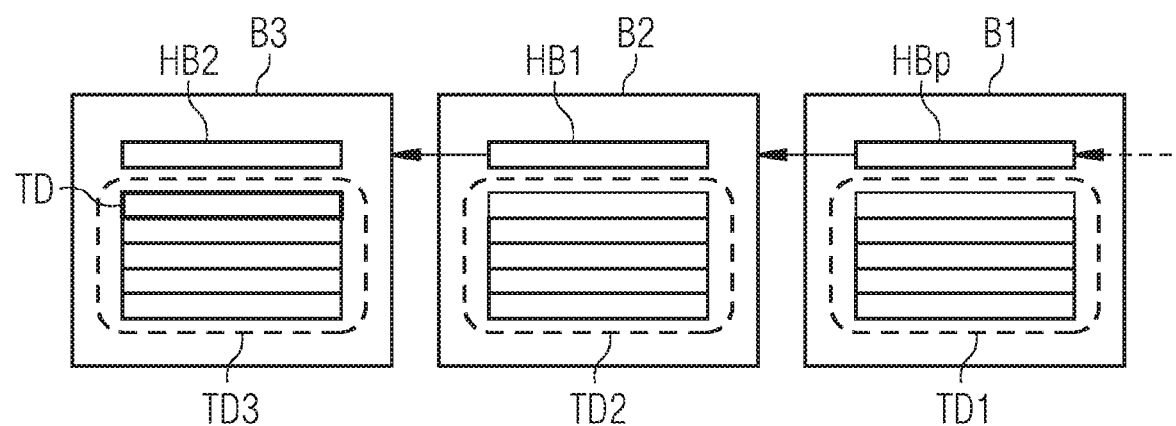
Figure 3:
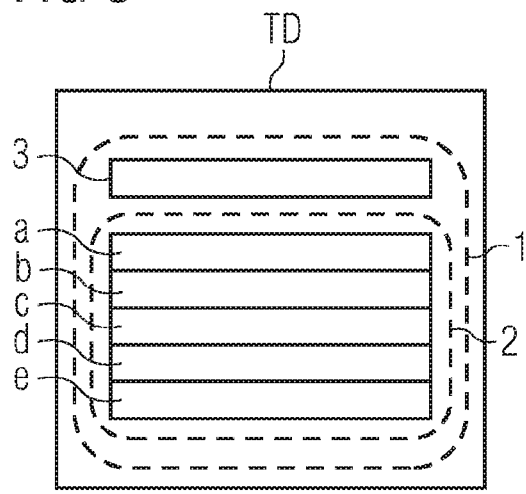

Some of the embodiments will be described in detail, with reference to the following figures, wherein like designations denote like members, wherein:
 FIG. 1 shows a schematic illustration of a network for implementing an exemplary embodiment of the invention;
 FIG. 2 shows a schematic illustration of a blockchain according to the exemplary embodiment of the invention; and
 FIG. 3 shows a schematic illustration of transaction data according to the exemplary embodiment of the invention.

DETAILED DESCRIPTION

An exemplary embodiment of the invention relates to the coupling of a plurality of devices D1, D2, D3, D4 over a public network NW having various blockchain nodes BN1, BN2, BN3. By way of example, these are nodes of the blockchain network Bitcoin, which uses the cryptocurrency Bitcoin as an incentive. Blockchain data structures and transactions are exchanged over the public network NW, wherein a plurality of blockchain nodes, in particular the three that are shown by way of example, are capable of mining blocks. In particular large computing centers are behind what are known as the mining node, these having sufficient computational capacity to solve cryptographic puzzles fast enough that they receive payment for the mining, provided that there is a validation by other nodes and if the chain that is formed by them is continued.

In the example that is described, the transaction data TD are formed by the devices D1 to D4 themselves. To this end, a respective processor PD1 is in particular provided on a respective device D1. In another variant, the transaction data TD of a plurality of devices D1 to D2 are formed in a centralized manner in an automation network AN by a superordinate authority Z.

The transaction data TD are formed depending on device usage information 1. Transaction data may in this case comprise device usage information on a multiplicity of different usage types. In one variant, transaction data comprise device usage information of a plurality of devices. In particular, in an automation network AN, a diagnostic computer D determines the device usage information 1 for all of the devices of the automation network AN. In particular, usage information of the machines is available by virtue of the diagnostic computer D. This comprises identification information 3 of the machine and usage information 2 of the machine. Device usage information 1 may furthermore be read from a respective memory of a respective device.

Individual devices D1 to D4 or central computers of installations containing a plurality of devices D1 to D2 that are coupled to the network transmit transaction data to one or more blockchain nodes of the blockchain network so that these are available there for mining.

FIG. 2 illustrates the principle of blockchain data structures. For the sake of illustration, a section of a blockchain chain having three blocks B1, B2, B3 is shown. The blocks B1 to B3 each contain the hash value of the preceding block HBp, HB1, HB2. The block B1 contains the hash value HBp of the preceding block, and the block B2 contains, in the data structure, an entry having hash value HB1 of the preceding block B1. In the same way, the third block B3 contains the hash value HB2 of the preceding block B2. In the hash value formation of a preceding block, all of the data in the block, in particular the transactions of this block, and also further data such as a timestamp, a digital signature or a proof of work indicator, enter into a function for forming a checksum, in particular a hash function. The blocks B1 to B3 contain associated transaction data TD1 to TD3 that relate to a transaction or a plurality of transactions. In particular, just one hash value that depends on a transaction is stored. In addition to transactions per se, in each case a timestamp, a digital signature and a proof of work indicator are also contained. These are stored when a block is created.

FIG. 3 schematically describes a transaction TD according to one exemplary embodiment of the invention. Transaction data TD in the device usage information 1 in particular contain identification information 3, for example a machine ID "Siemens SiXY SN3175438".

Furthermore, the transaction data TD contain usage information 2 of the device, comprising indications with regard to operating hours, error codes, a degradation status, a next maintenance and a timestamp. By way of example, the information "operating hours: 3617" is contained as first entry a, the information "error codes: 012 716" is contained as second entry b, the information "Degradation Status: 67%" is contained as third entry c, the information "Next maintenance: 7 weeks/320 h" is contained as fourth entry d, and the information "timestamp: 20160219-102237" is contained as fifth entry e.

The transaction data TD contain in particular, in addition to the device usage information 1, a cryptographic checksum of the device usage information 1, for example a message authentication code, which is calculated by way of a cryptographic secret. The data are therefore cryptographically secured. The cryptographic checksum may in particular be a message authentication code, for example AES-CBCMAC or HMAC-SHA256, or a digital signature, for example RSA PKCS #1, DSA, ECDSA. A cryptographic checksum may be formed by way of the transaction itself or a part of the transaction or by way of a hash value of the transaction or by way of a hash value of a part of the transaction. In particular, a cryptographic checksum may be formed depending on the consumption data and the device identification information. The cryptographic checksum is contained in a transaction, that is to say it constitutes transaction data. The cryptographic key used to form the cryptographic checksum may in particular be a device key of the device specified in the transaction data. A device or a diagnostic system associated with the device may digitally sign the device usage information. The signature may in this case be contained in the form of transaction data in a transaction that is signed with a further transaction signature key. As an alternative, the determined signature may directly be the signature of the blockchain transaction.

In the formation of the block in the blockchain network, a hash value determined from the transaction data TD is advantageously recorded.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for securing a device usage information, comprising:
   determining, by a diagnostic computer in an automation network, the device usage information of a plurality of devices located within the automation network and coupled to the diagnostic computer, wherein the automation network is a separate network from a public network having a plurality of blockchain nodes;
   generating transaction data of the plurality of devices in a centralized manner in the automation network by a superordinate authority located within the automation network and coupled to the diagnostic computer and the plurality of devices within the automation network, depending on the device usage information, wherein a hash value of the device usage information is contained in the transaction data;
   generating a blockchain data structure, wherein the blockchain data structure is based on a cryptocurrency and comprises the transaction data or a checksum of the transaction data; and
   transmitting the generated blockchain data structure to at least one blockchain node of the plurality of blockchain nodes.

2. The method as claimed in claim 1, wherein the device usage information contains usage information of the device and identification information of the device.

3. The method as claimed in claim 2, wherein the usage information includes an operating time, a mileage, operating hours, repair data, diagnostic data, wear data or maintenance data.

4. The method as claimed in claim 1, wherein the hash value of the usage information and a random or pseudorandom string of characters is formed, and the hash value enters into the transaction data.

5. The method as claimed in claim 2, wherein the identification information is configured in a form of pseudonym information of the device.

6. The method as claimed in claim 5, wherein the pseudonym information is configured in a form of a hash value of the identification information or in a form of a hash value of the identification information and a random or pseudorandom string of characters.

7. The method as claimed in claim 1, wherein the blockchain data structure contains further transaction data, a timestamp, a digital signature and/or a proof of work indicator.

8. The method as claimed in claim 1, wherein the transaction data or the device usage information or the usage information or the identification information is secured by way of a cryptographic checksum or of a message authentication code or of a certificate.

9. A system for securing a device usage information, comprising:
   a diagnostic computer in an automation network for determining the device usage information of the plurality of devices located within the automation network and coupled to the diagnostic computer device also within the automation network, wherein the automation network is a separate network from a public network having a plurality of blockchain nodes, wherein transaction data of the plurality of devices are generated in a centralized manner in the automation network, depending on the device usage information, wherein a hash value of the device usage information is contained in the transaction data;
   at least one processor for generating a blockchain data structure, wherein the blockchain data structure is based on a cryptocurrency and comprises the transaction data or a checksum of the transaction data; and at least one blockchain node for transmitting the generated blockchain data structure to at least one further blockchain node.

10. The system as claimed in claim 9, wherein the first processor is configured so as to secure the device usage information or usage information of the device usage information or identification information of the device usage information by way of a cryptographic checksum or of a message authentication code or of a certificate.

11. The system as claimed in claim 9, wherein the first processor is configured so as to form a hash value using the transaction information or using the device usage information or using usage information of the device usage information or using identification information of the device usage information, in each case in accordance with a combination with a random or pseudorandom string of characters.

12. The system as claimed in claim 9, wherein the at least one second processor is formed on the blockchain node.

* * * * *